United States Patent [19]

Atwell et al.

[11] Patent Number: 5,436,207
[45] Date of Patent: Jul. 25, 1995

[54] PROCESS FOR PREPARING SILICON CARBIDE POWDER FROM VAPORIZED POLYSILOXANES

[75] Inventors: William H. Atwell; Donald M. Bartos, both of Midland; Patrick J. Harder, Bay City; Jonathan Lipowitz; Chandan K. Saha, both of Midland, all of Mich.

[73] Assignee: Dow Corning Corporation, Midland, Mich.

[21] Appl. No.: 164,865

[22] Filed: Dec. 10, 1993

[51] Int. Cl.⁶ ............................................. C04B 35/571
[52] U.S. Cl. ........................................ 501/88; 423/346
[58] Field of Search ................. 501/88, 89; 556/9, 10, 556/11, 451, 457; 423/345, 346

[56] References Cited

U.S. PATENT DOCUMENTS 3,346,338  10/1967  Latham .
4,295,890  10/1981  Stroke .
4,465,647   8/1984  Hatta et al. .
4,534,948   8/1985  Baney .
4,571,331   2/1986  Endou et al. .
4,613,490   9/1986  Suzuki et al. .
4,676,966   6/1987  Endo et al. .
4,840,781   6/1989  Noake .
5,128,494   7/1992  Blum ................................. 556/457

FOREIGN PATENT DOCUMENTS 592456  2/1960  Canada .

*Primary Examiner*—Karl Group
*Attorney, Agent, or Firm*—Roger E. Gobrogge

[57] ABSTRACT

Disclosed is a process for the formation of silicon carbide powder in which vaporized polysiloxanes are reacted and pyrolyzed in a single heating step to form the silicon carbide powder. The process is simple and inexpensive and yields powder having desirable characteristics.

10 Claims, 1 Drawing Sheet

PROCESS FOR PREPARING SILICON CARBIDE POWDER FROM VAPORIZED POLYSILOXANES

BACKGROUND OF THE INVENTION

The present invention relates to a process for preparing silicon carbide powder from a vaporized polysiloxane. This process is unique in that the polysiloxane is reacted and pyrolyzed to form the SiC powder in a single step. The silicon carbide powder produced by this process, moreover, is desirable in that it is non-agglomerated and, thus, can be densified to form silicon carbide bodies.

Silicon carbide ceramics have found utility in numerous applications because of their desirable properties and characteristics. The production of such ceramics, however, requires silicon carbide powder which is inexpensive, pure and in a form which can be easily sintered to the desired ceramic.

Silicon carbide powder can be produced by a number of known techniques using a variety of silicon containing compounds. For example, SiC can be formed by vapor phase pyrolysis of organosilicon compounds such as alkylated silanes (see e.g., Canadian Patent No. 592,456); mixtures of silicon halides and hydrocarbon gases (see e.g., U.S. Pat. Nos. 3,346,338 and 4,295,890); and polysilanes (see e.g., 4,676,966 and 4,571,331). Similarly, silicon carbide can be formed by the reaction of silica and carbon or by the pyrolysis of a variety of non-vapor phase organosilicon polymers such as polysiloxanes (see e.g., U.S. Pat. No. 4,840,781); polycarbosilanes (see e.g., U.S. Pat. No. 4,465,647); and polysilanes (see e.g., 4,534,948). What is not taught in these references, however, is the use of vaporized polysiloxanes for forming the SiC powder.

Suzuki et al. in U.S. Pat. No. 4,613,490 teach a process for forming SiC powder in which a polysiloxane undergoes a vapor phase reaction to form an SiCO product at a temperature less than 1600° C. which is then heated (calcined) to form the resultant powder. As is evident, this process is time consuming and expensive because it requires a second heat (calcining) step to form the powder. In addition, the powder prepared by this 2 step process is often highly agglomerated and is difficult to densify.

The present application discloses for the first time that silicon carbide powder can be produced from vaporized polysiloxanes in a process with only a single heating step.

SUMMARY OF THE INVENTION

The present invention is a process for preparing silicon carbide powder. The method comprises introducing a vaporized polysiloxane into a reaction chamber. Reaction of the polysiloxane vapor is then induced at a temperature above about 1600° C. for a time sufficient to convert the polysiloxane vapor into silicon carbide powder. The resultant silicon carbide powder is then merely collected.

BRIEF DESCRIPTION OF THE DRAWING

The Figure is a diagram of the process of the instant invention.

DETAILED DESCRIPTION OF THE INVENTION

Figure 1:
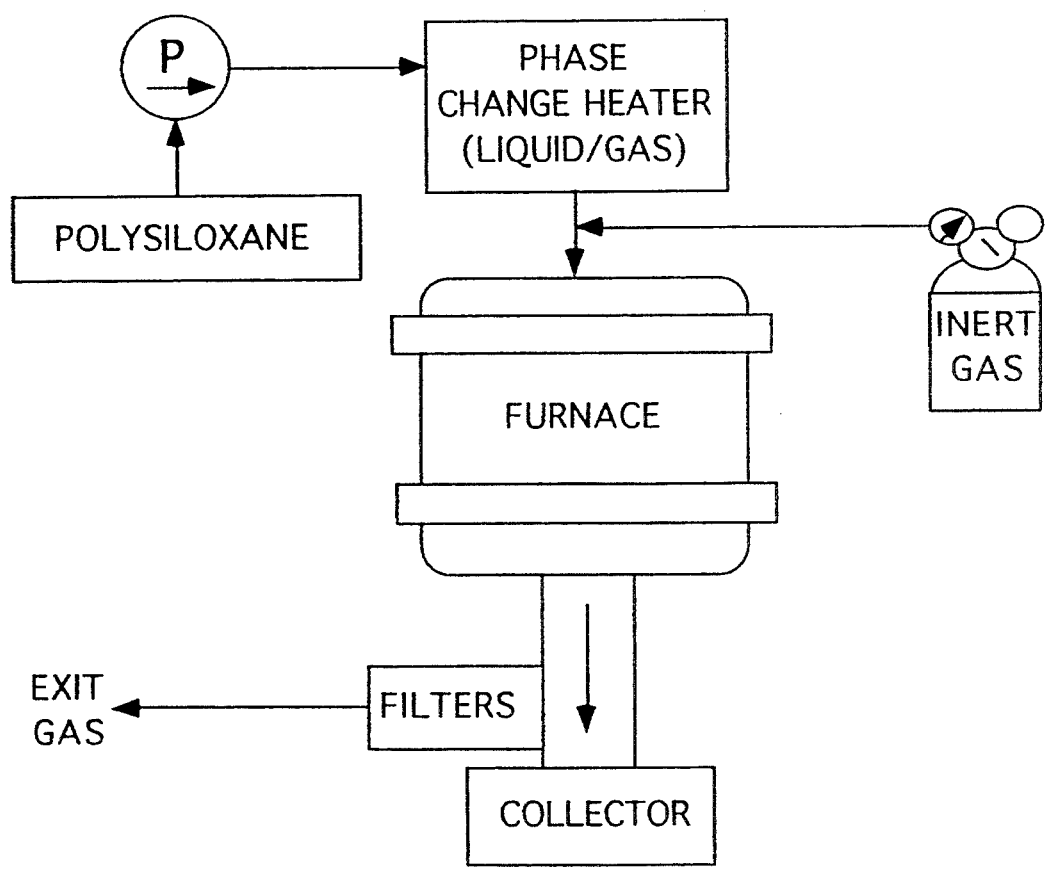

The present invention is based on the unexpected discovery that silicon carbide powder can be formed by a single step vapor phase reaction and pyrolysis of a polysiloxane. This was particularly unexpected since the prior art taught that the SiC derived from a polysiloxane required an additional pyrolysis step. Avoiding this second step provides substantial savings in both time and capital.

In addition, the SiC powder produced by the process of this invention has characteristics such as desirable size distributions (without grinding) and morphology, high purity, and a good densification profile. This, too, was unexpected since conventional processes produce powders which are highly agglomerated and, thus, require grinding or milling with media (which is a source of impurities) to produce a powder which densifies.

The polysiloxanes which can be used in the process of this invention comprise any which are either in their vapor phase at room temperature or which can be vaporized by heating. The vaporization temperature, however, should be low enough that the polysiloxane is vaporized before it begins to decompose. The inventors herein postulate that decomposition in the vapor state provides the finely divided powders produced herein.

The polysiloxanes useful herein include, for example, cyclic polysiloxanes of the structure:

wherein each R independently comprises a hydrogen or a hydrocarbon of 1–6 carbon atoms and n is an integer of 3–6. Examples of R groups include alkyls such as methyl, ethyl, propyl, butyl, etc., alkenyls such as vinyl, allyl, hexenyl, etc, alkoxy groups such as methoxy, ethoxy, etc., or cyclic groups such as cyclopenyl, cyclohexyl or phenyl. Also contemplated by the above structure are cyclic polysiloxane copolymers.

Other examples of suitable polysiloxanes included linear polysiloxanes of the structure:

wherein each R independently comprises a hydrogen or a hydrocarbon of 1–6 carbon atoms and n is an integer of 0–6. Examples of R groups include alkyls such as methyl, ethyl, propyl, butyl, etc., alkenyls such as vinyl, allyl, hexenyl, etc, alkoxy groups such as methoxy, ethoxy, etc., or cyclic groups such as cyclopenyl, cyclohexyl or phenyl. Again, copolymers are also contemplated by the above structure.

Additionally, it is contemplated any polysiloxane which will evolve volatile polysiloxanes upon heating can be used herein. For instance, a broad molecular weight polymer can be used herein even though only the low molecular weight species will be volatilized. Similarly, any polymer which will decompose upon heating to evolve volatile species can also be used.

Finally, it is also contemplated that mixtures of any of the above polysiloxanes can be used in the process of the present invention.

Naturally, it is anticipated that the stoichiometry of the SiC powder (i.e., the Si/C ratio) produced by the process of this invention will vary depending on the polymer and its substituents. For instance, polymers with unsaturated alkyls or phenyl groups will likely contain excess carbon in the SiC powder. Such variability, however, is valuable in that it allows one to produce SiC powders with any desired stoichiometry.

As noted above, the polysiloxane must be in the vapor phase to be useful in the present invention. As such, if the polysiloxane is not in the vapor phase at room temperature, it must first be vaporized. This is generally accomplished by heating the polysiloxane to a temperature above its boiling point. Generally, the boiling point of the polysiloxane should be below about 800° C., preferably below 600° C. and most preferably below about 400° C. for use in the invention. The use of alternative techniques which are known in the art for producing vapors, however, are also contemplated herein. For instance, the use of vacuum or the use of a gas to decrease the partial pressure of the polysiloxane vapor below the equilibrium vapor pressure of the polysiloxane liquid is contemplated herein.

The vaporized polysiloxane is then fed into a reaction chamber. The polysiloxane vapor may be fed into the reaction chamber by itself (i.e., neat) or it may be diluted in an inert gas such as argon, helium etc. When diluted, the concentration of polysiloxane vapor is generally not critical and can vary over a wide range (eg., 0.01 volume percent and up).

Whether dilute or neat, enough polysiloxane vapor is fed into the reaction chamber to produce the desired product. The vapor may be introduced as a continuous flow through the reaction chamber or the vapor may be introduced and the flow stopped to increase residence time. Obviously, the amount of vapor introduced into the reactor will be determined by factors such as the size of the reactor, the pyrolysis temperature, the desired yield, and the like. In addition, however, the present inventors have discovered that the amount and rate of the vapor affects powder characteristics such as yield, morphology, size and chemistry. As such, the present inventors contemplate that controlling these variables will allow one to produce a specific powder for a given utility.

Generally, the pressure in the reaction chamber is not critical. Pressures in the range of between about 0.001 up to several atmospheres are generally useful herein.

The reaction chamber used in the invention is not critical and any which can be heated to the temperature necessary for reaction and pyrolysis can be used herein. For instance, reactors such as a tube furnace or those described in the Examples can be used herein.

Once the polysiloxane vapor is in the reactor, the pyrolysis of the vapor to form SiC containing powder and the calcination of such powder to form the desired product can be initiated by a single heating step. Generally, initiation of this reaction is spontaneous in the presence of the elevated temperature used herein. As such, in its simplest form the invention can comprise feeding the polysiloxane vapor into a heated reaction chamber wherein the polysiloxane will react and be heated to form the desired product. It is contemplated, however, that alternative approaches such as introducing the vapor into a reaction chamber followed by heating the chamber to the desired temperature or using plasma to initiate the reaction are also within the scope of the present invention.

The temperature within the reaction chamber should be sufficient to insure complete conversion of the polysiloxane to silicon carbide. If insufficient temperatures are used, sufficient oxygen is not lost and silicon oxycarbide powders are formed. Generally, the temperatures should be above about 1600° C., preferably at least about 1800° C. and more preferably at least about 2000° C.

The residence time of the vapor within the reaction chamber should be sufficient to insure complete conversion of the polysiloxane to silicon carbide. Generally, times in the range of a fraction of a second up to several hours can be used, depending on the reaction chamber. Generally, shorter residence times are preferred (eg., 0.01 seconds up to 30 minutes).

The inventors herein have shown that factors such as temperature and residence time at temperature affect powder characteristics such as morphology and particle size. As such, these factors can be controlled to produce the desired powder.

After the polysiloxane is converted to the desired silicon carbide powder in the reaction chamber, the powder is merely collected. The method of collection is not critical and nearly any practical means can be used.

The resultant powders are generally finely divided and can be produced in a wide variety of sizes and morphologies. For instance, particle sizes in the range of about 0.001 to about 10 microns can be produced (having either narrow or broad size distributions) and morphologies of cubic (beta), non cubic (alpha) and mixtures thereof can be produced. As noted above, the powders can also have nearly any stoichiometry desired from stoichiometric SiC to excess silicon or carbon. Moreover, small amounts of oxygen (eg., less than about 5 %) may also be present. Finally, the powders are generally pure (i.e., low levels of impurities) because the only reactant in the process is the polysiloxane which can be provided in a pure form.

Such powders have distinct advantages over powders produced by alternative 2 heating step processes. For instance, powders produced in conventional silica—carbon processes have high levels of contaminants which require extensive chemical cleaning. Similarly, powders produced by alternative processes are often agglomerated such that grinding and/or milling are necessary prior to use. Finally, the powders have a good particle size distribution which provides good green density.

The following non-limiting examples are provided so that one skilled in the art may more readily understand the invention.

Example 1–4 (Comparative)

Octamethylcyclotetrasiloxane ($[(CH_3)_2Si-O]_4$) was vaporized in a bath at 226° C. The resultant vapor was fed at 4 cc/min into an Astro tube furnace accompanied by an argon flow of 3.22 L/min. The tube furnace was maintained at a reaction temperature of about 1400° C. and the residence time of the vapor in the furnace was about 2 minutes. The resultant powder was dark grey and had a composition comprising 55.61 wt. % Si, 12.81 wt. % O, and 31.58 wt. % C (by difference). The powder had a density of 2.79 g/cm$^3$, and a crystallite size of 77 angstroms. X-ray diffraction analysis of the powder showed 94 wt. % beta SiC and 6 wt. % C in the crystalline phase.

Samples of the above powder were loosely packed in a graphite crucible and heated (calcined) at 1500° C. (Example 1), 1600° C. (Example 2), 1800° C. (Example 3) and 1900° C. (Example 4) in flowing argon. The results are presented in Table 1.

TABLE 1

| | Characteristics of Calcined Powder | | | |
|---|---|---|---|---|
| Characteristics | Ex 1 1500° C. | Ex 2 1600° C. | Ex 3 1800° C. | Ex 4 1900° C. |
| Color | Yellow-white | Light grey | Light green | Dark green |
| Composition (wt %) | | | | |
| Si | 62.87 | 68.23 | 66.42 | 69.01 |
| O | 2.22 | 0.43 | 0.14 | 0.11 |
| C (difference) | 34.91 | 31.34 | 33.44 | 30.88 |
| Calculated excess Carbon | — | 2.2 | 5.3 | 1.3 |
| X-ray Diffraction (wt %) | | | | |
| beta SiC | 70 | 96 | 98 | 95 |
| alpha SiC | 30 | 4 | — | — |
| Si | — | — | — | — |
| SiO | — | — | — | — |
| C | — | — | 2 | 5 |
| Particle Size (microns) | 0.05–0.2 | 0.2–0.5 | 0.5–3 | 2–5 |

Some of the above powder was ball milled. Samples of the milled and unmilled powders were mixed into powder formulations for sintering. The mixtures comprised 87.4 wt. % SiC powder, 0.33 wt. % B₄C, 11.93 wt. % polysiloxane binder of the structure $(PhSiO_{1.5})0.27$-$(MeSiO_{1.5})_{0.18}$-$(Me_2SiO)_{0.18}(MeViSiO)_{0.25}(PhSiO)_{0.12}$ (as prepared in Example 11 of U.S. Pat. No. 4,888,376), 0.24 wt. % Lupersol (2,5-bis(t-butylperoxy)-2,3-dimethylhexane) and 0.55 wt. % of a dispersant comprising polyolefin aminoester salt and diethylethanolamine. The mixtures were prepared by sonication of the above materials in a mixture of ethanol and toluene followed by stripping the solvents. The resulting dry mass was ground and sieved (100 mesh). The powders were then compacted to green bodies (pellets) at 30 Ksi yielding the results in Table 2.

TABLE 2

| | Compaction Behavior of SiC Powders | |
|---|---|---|
| Ex No. | Green Density (No Ball Milling) | Green Density (Ball Milled) |
| 1 | could not be formed | — |
| 2 | 1.49 | 1.89 |
| 3 | 1.91 | — |
| 4 | 2.13 | — |

The above green bodies were then sintered at 2070° C. for 1 hour under Argon. Table 3 shows the results.

TABLE 3

| | Characteristics of Sintered Bodies | | |
|---|---|---|---|
| | | Sintered Density | XRD* Phase Content (%) |
| Ex No. | Milling | (g/cm³) | Beta / Alpha |
| 1 | no | 2.15 | 37 / 63 |
| 2 | yes | 2.5 | 11 / 89 |
| 3 | no | 2.34 | 0 / 100 |
| 4 | no | 2.19 | 39 / 61 |

*X-ray Diffraction

Example 5–7

Octamethylcyclotetrasiloxane ($[(CH_3)_2Si$-$O]_4$) was vaporized and fed into the induction furnace of the Figure. The run conditions are set forth in Table 4. The characteristics of the resultant powder are set forth in Table 5.

TABLE 4

| | Run Conditions | | | | | |
|---|---|---|---|---|---|---|
| | Siloxane | | | | Max. | |
| EX No | Feed Rate (ml/min) | Argon Flow (ml/min) | Argon Blanket (ml/min) | Nozzle Temp (°C.) | Furnace Temperature (°C.) | Column Pressure (psig) |
| 5 | 4 | >10 | >10 | 500–700 | 2000 | 0–0.7 |
| 6 | 4 | 4 | 4 | 500–600 | 2000 | 0–0.3 |
| 7 | 4 | 4 | 4 | 500–600 | 1800 | 0–0.3 |

TABLE 5

| | Characteristics of Powder | | |
|---|---|---|---|
| Characteristics | Example 5 | Example 6 | Example 7 |
| Crystal Structure | beta | beta | beta |
| Morphology | highly agglomerated | not agglomerated | not agglomerated |
| Particle Size (micron) | 0.1–0.5 | 0.3–2 | 0.1–1 |
| Sp. Surface Area (m²/g) | 11.51 | 5.46 | 8.92 |
| Oxygen Content (%) | 3.09 | 0.68–0.7 | 2.58 |
| Flow Charact. of Raw Powder | | | |
| Fill Density | 0.156 | 0.441 | 0.274 |
| Tap Density | 0.205 | 0.352 | 0.352 |
| Green Density* (g/cm³) | 1.82 | 2.35 | 2.20 |
| Fired Density* (g/cm³) | | | |
| 2070° C. | no densification | 2.95 | 2.98 |
| 2100° C. | | 2.97 | 2.98 |
| XRD Phase Cont. | | | |
| 2070° C. beta | not measured | 56.6 | 53.5 |
| alpha | | 43.0 | 46 |
| carbon | | 0.4 | 0.5 |
| 2100° C. beta | | 25 | 47.6 |
| alpha | | 74.4 | 52 |
| carbon | | 0.6 | 0.4 |

*Results on bodies prepared by mixing and pressing the same polysiloxane formulation as Examples 1–4.

That which is claimed is:

1. A single heating step process for preparing silicon carbide powder from vaporized polysilixane comprising:
   introducing a vaporized polysiloxane into a reaction chamber;
   heating the polysiloxane vapor in the reaction chamber to a temperature above about 1600° C. for a time sufficient to form silicon carbide powder; and collecting the silicon carbide powder.

2. The method of claim 1 wherein the polysiloxane comprises cyclic polysiloxanes of the structure:

$[R_2SiO]_n$ wherein each R independently comprises a hydrogen or a hydrocarbon of 1–6 carbon atoms and n is an integer of 3–8.

3. The method of claim 2 wherein the polysiloxane comprises cyclic polysiloxanes of the structure:

$[(CH_3)_2SiO]_n$ where n=3–8.

4. The method of claim 1 wherein the polysiloxane comprises a linear polysiloxane of the structure:

$R_3Si$-$O$-$[R_2SiO]_n$-$SiR_3$ wherein each R independently comprises a hydrogen or a hydrocarbon of 1–6 carbon atoms and n is an integer of 0–8.

5. The method of claim 1 wherein the vaporized polysiloxane is in an inert gas.

6. The method of claim 1 wherein the temperature is at least about 1800° C.

7. The method of claim 1 wherein the temperature is at least about 2000° C.

8. The method of claim 1 wherein the time sufficient to form the silicon carbide powder is between about 0.01 second and about 30 minutes.

9. The method of claim 1 wherein the pressure in the reaction chamber is between about 0.001 and 2 atmospheres.

10. A process for preparing silicon carbide powder comprising:

introducing a polysiloxane vapor into a reaction chamber;

heating the polysiloxane vapor in the reaction chamber to a temperature above about 1600° C. for a time sufficient to form a powder containing silicon carbide with oxygen content less than about 5 wt. %; and collecting the silicon carbide powder.

* * * * *